(12) United States Patent
Fortenot et al.

(10) Patent No.: US 8,955,071 B2
(45) Date of Patent: *Feb. 10, 2015

(54) CONTROLLED PASSWORD MODIFICATION METHOD

(71) Applicant: International Business Machines Corporation, Armonk, NY (US)

(72) Inventors: Nathan Fortenot, Austin, TX (US); Jeffrey D George, Austin, TX (US); Ryan P Grimm, Austin, TX (US); Joel H Schopp, Austin, TX (US); Michael T Strosker, Austin, TX (US); George C Wilson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/060,673

(22) Filed: Oct. 23, 2013

(65) Prior Publication Data

US 2014/0282946 A1 Sep. 18, 2014

Related U.S. Application Data

(63) Continuation of application No. 13/795,104, filed on Mar. 12, 2013.

(51) Int. Cl.
*H04L 29/06* (2006.01)
*H04L 9/32* (2006.01)
*G06F 21/46* (2013.01)

(52) U.S. Cl.
CPC ............. *G06F 21/46* (2013.01); *H04L 63/083* (2013.01)

USPC .................................................. 726/6; 726/18

(58) Field of Classification Search
None
See application file for complete search history.

(56) References Cited

U.S. PATENT DOCUMENTS

| | | | | |
|---|---|---|---|---|
| 7,353,536 | B1 * | 4/2008 | Morris et al. ...................... | 726/6 |
| 7,660,795 | B2 * | 2/2010 | Barrett et al. ..................... | 726/6 |
| 8,024,577 | B2 * | 9/2011 | Ohmori et al. ................ | 713/184 |
| 8,291,472 | B2 * | 10/2012 | Bak et al. .......................... | 726/2 |
| 2009/0210938 | A1 * | 8/2009 | Childress et al. ............... | 726/18 |
| 2009/0320107 | A1 * | 12/2009 | Corella ............... | 726/6 |
| 2010/0122324 | A1 * | 5/2010 | Welingkar et al. ................ | 726/5 |
| 2011/0093939 | A1 * | 4/2011 | Barbour et al. ................... | 726/7 |
| 2011/0107400 | A1 | 5/2011 | Shankaranarayanan et al. | |
| 2011/0191838 | A1 * | 8/2011 | Yanagihara ....................... | 726/7 |
| 2011/0271098 | A1 * | 11/2011 | Bishop et al. ................. | 713/153 |
| 2011/0289569 | A1 * | 11/2011 | Barrett et al. ..................... | 726/6 |
| 2012/0166553 | A1 | 6/2012 | Rubinstein et al. | |
| 2012/0226701 | A1 | 9/2012 | Singh | |

* cited by examiner

*Primary Examiner* — Christopher Revak
(74) *Attorney, Agent, or Firm* — Steven Bennett; Damion Josephs; Daniel E. McConnell

(57) ABSTRACT

A method which controls modification of passwords. An end user designates, in advance, a universe of social media contacts such as friends on social media web sites such as Facebook and LinkedIn. Contacts so identified are used as a set of potential identity verifiers. In order to enable a reset or modification of an account password, a subset of the universe is required to assert that they have verified the identity of the user requesting to reset a password. Such verification can be accomplished by varying means by those to whom an inquiry has been directed.

3 Claims, 3 Drawing Sheets

CONTROLLED PASSWORD MODIFICATION METHOD

RELATED APPLICATION

This application claims priority from, and is a continuation of, application Ser. No. 13/795,104 filed Mar. 12, 2013.

FIELD AND BACKGROUND OF INVENTION

Many users of data handling devices use them to access and maintain online, internet, accounts. Such accounts, as well known, may range from banking to investment management to email to internet shopping accounts. Typically, such accounts are secured by passwords, supposedly known only to the authorised user. However, account hacking has become a major problem, and those interested in gaining unauthorized access to such end user online accounts have sophisticated tools which enable hacking beginning from personal information which is typically readily available from internet resources such as telephone directories, social media programs and linked accounts. One of the major vulnerabilities of many password systems is a password reset mechanism which can be, and has been, exploited to gain access to online accounts.

SUMMARY OF THE INVENTION

Here, a method is presented which controls modification of passwords. The method contemplates that an end user will designate, in advance, a universe of social media contacts such as friends on social media web sites such as Facebook and LinkedIn. Contacts so identified will be used as a set of potential identity verifiers. A subset of the universe will be required to assert that they have verified the identity of a user requesting to reset a password. Such verification can be accomplished by varying means by those to whom an inquiry has been directed.

The method may be exercised in an apparatus which may take two forms: an end user device onto which computer executable code is loaded to facilitate the method, and a non-transistory, tangible computer medium bearing computer executable program code which, when executing on a processor and associated components, facilitates the method described.

BRIEF DESCRIPTION OF DRAWINGS

Some of the purposes of the invention having been stated, others will appear as the description proceeds, when taken in connection with the accompanying drawings, in which.

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
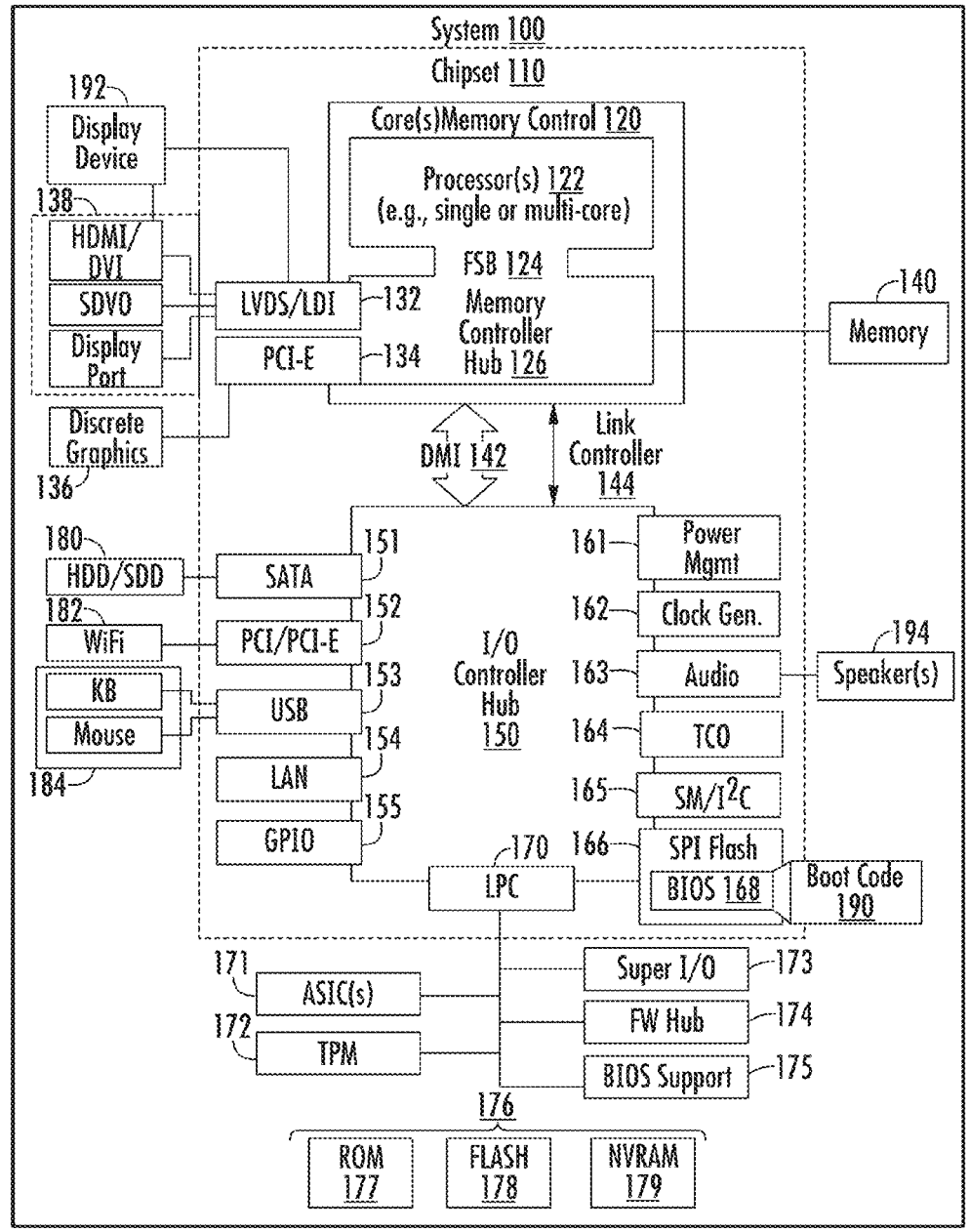
FIG. 1 is a representation of an information handling or computer system.

While various exemplary circuits or circuitry are discussed, FIG. 1 depicts a block diagram of an illustrative exemplary computer system 100. The system 100 may be a desktop computer system or a workstation computer; however, as apparent from the description herein, a client device, a server or other machine may include other features or only some of the features of the system 100. Similarly, hand held devices such as a smartphone or tablet may function as a computer system as here described.

The system 100 of FIG. 1 includes a so-called chipset 110 (a group of integrated circuits, or chips, that work together) with an architecture that may vary depending on manufacturer (e.g., INTEL®, AMD®, etc.). The architecture of the chipset 110 includes a core and memory control group 120 and an I/O controller hub 150 that exchange information (e.g., data, signals, commands, etc.) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (e.g., single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (e.g., to provide support for a type of RAM that may be referred to as "system memory"). The memory controller hub 126 further includes a LVDS interface 132 for a display device 192 (e.g., an LCD, CRT, a flat panel, a projector, etc.). A block 138 includes some technologies that may be supported via the LVDS interface 132 (e.g., serial digital video, HDMI/DVI, display port). The memory controller hub 126 also includes a PCI-express interface (PCI-E) 134 that may support discrete graphics 136. In FIG. 1, the I/O hub controller 150 includes a SATA interface 151 (e.g., for HDDs, SDDs, etc.), a PCI-E interface 152 (e.g., for wireless connections 182), a USB interface 153 (e.g., for input devices 184 such as keyboard, mice, cameras, phones, storage, etc.), a network interface 154 (e.g., LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (e.g., for speakers 194), a TCO interface 164, a system management bus interface 165, and SPI Flash 166, which can include BIOS 168 and boot code 190. The I/O hub controller 150 may include gigabit Ethernet support.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168. As described herein, a device may include fewer or more features than shown in the system 100 of FIG. 1.

As suggested above, the computer system 100 or a similar device may be used by an end user to access various accounts. In accessing such accounts, the end user will identify himself or herself to the service provider by using a password. From time to time, for various reasons related to security of the user's access, the user will wish to modify the password. As users of such systems and account are accustomed, permission to modify a password has in the past been derived from an ability to enter an existing password. In some instances, a telephone conversation or online chat with a service provider can be used to reset a password, and it is in that process that the risk of intrusion is increased. Service providers have typically required only limited personal information to identify a user and allow password modification or reset. Depending upon the provider, that information may be such as a birth date, birth location, address, telephone number, or answer to a security question. A person intending to gain unauthorized access to an account may gather such information from various internet resources, including social media. Once access to a single account is gained, it is possible that other accounts, if linked by the user under attack, can be accessed as well and the password changes be rippled across numerous accounts. Theft of personal identity is a possibility in such circumstances.

In order to guard against such results, a method is proposed in which an account holder would designate, in advance, a number of their social media contacts who can be used as identity verifiers. In order for the account holder to modify or reset a password, a portion of that universe of contacts would be required to assert that they have verified the identity of the requester. The specific means of such versification between the members of the universe to which an inquiry is addressed and the account holder may vary with circumstances.

By way of example, if an account holder/end user here designated as Tom has a universe of two hundred social media contacts, Tom may select six to ten of those contacts as verifiers to whom an inquiry is to be directed. Tom may also select a threshold number of verifiers, such as three, to meet the requirement of verification. Thus, Tom may reset or modify a password for an account after three of his selected contacts have verified that the request to do so comes from Tom.

That will happen when Tom makes the request, and inquires are sent to the potential verifiers. Assume for purposes of this discussion that inquiries are sent to Alice, Bob, Charlie and Doug. Alice calls Tom on the telephone and asks if he is attempting to change a password. Bob walks down the hall and asks Tom face to face. Charlie ignores the verification request as he is busy with other matters. Doug exchanges text messages with Tom about the attempted change in password. Each of Alice, Bob and Doug confirm their respective exchanges, verifying Tom's identity. This meets the threshold Tom set and Tom is allowed to reset or modify the password for the account in question.

Figure 2:
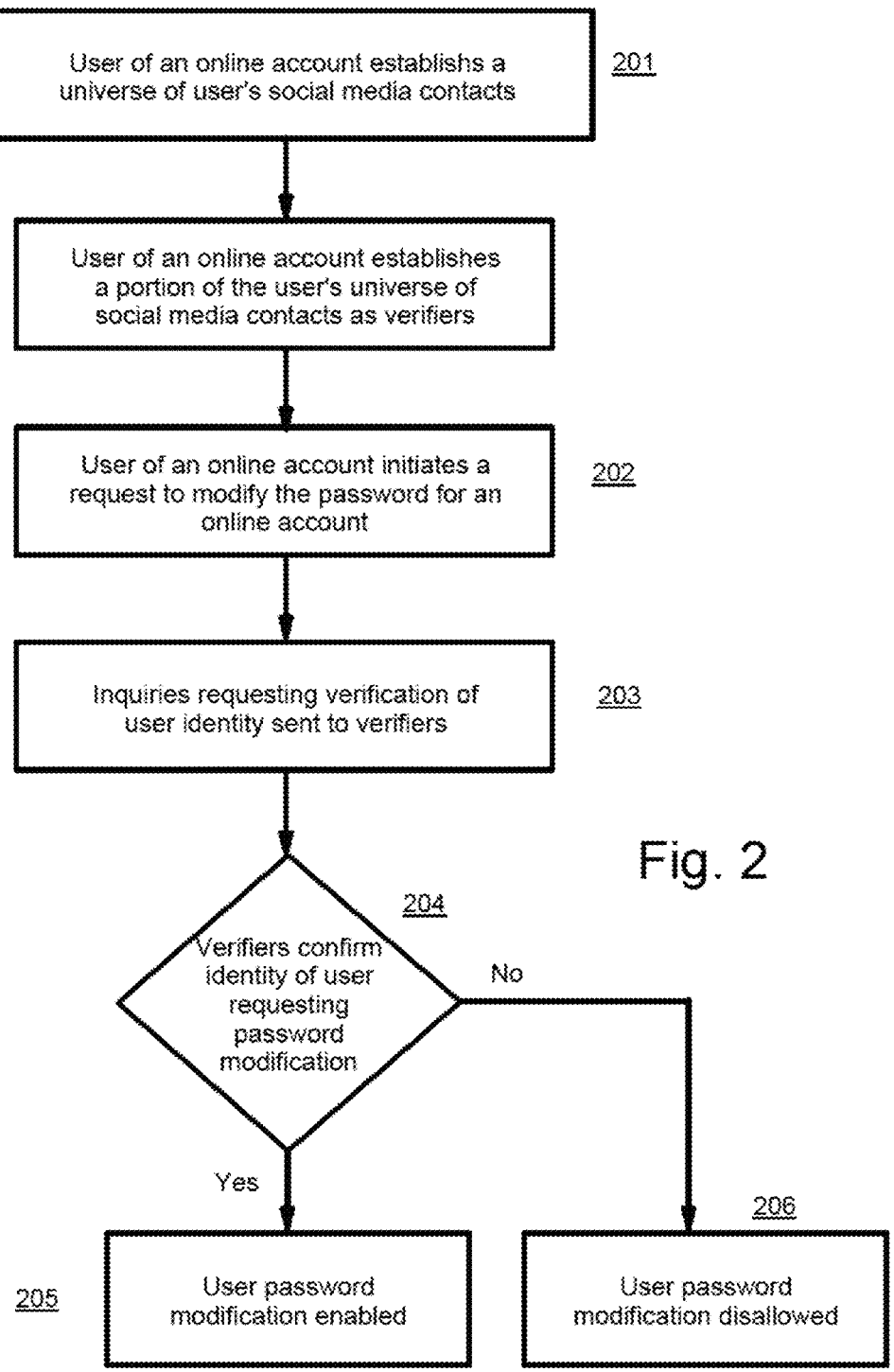
FIG. 2 is a flow chart illustrating certain steps in a method contemplated by this disclosure.

This process is represented in the flow chart of FIG. 2. As represented there, Tom will establish (200) a universe of his social media contacts, such as those among his friends on Facebook or to whom he is linked through LinkedIn or some other service of the sort here called social media. Within that universe, Tom will establish (201) a portion to be verifiers of his identity. Tom will then initiate (202) a request to modify or reset a password for one of his online accounts. An inquiry is then sent (203) to the verifiers identified by Tom. Should the verifiers confirm (204) that the request is from Tom, after contact with him, then Tom requested reset or modification is enabled (205). Should such confirmation fail, Tom's or an attacker's requested reset or modification is disallowed, refused or rejected (206).

As will be understood, during this process Tom will be executing on the processor 122 of a computer system such as system 100 of FIG. 1 computer executable program code stored in, for example, memory 140 or other memory elements accessible to the processor. That code, when executing, will communicate the identities of Tom's selected universe of social contacts; communicate a request by Tom to change a password for an online account; and communicate to Tom permission to change a password upon confirmation of Tom's identity by his selected number of social contacts to whom an inquiry has been addressed.

The process, and the code which enables its execution, may have additional characteristics. For example, the establishment of the universe of social contacts may comprise delaying for an interval of time any change in the selection of contacts to be included in the universe or as verifiers. This is a safeguard against an attacker who may have breached a level of security being able to change the contacts and then quickly gain verification of the attacker to enable completion of the attack. Similarly, the enabling of the user to change a password may comprise disallowing enablement in the event that the universe of social contacts has been changed within a predetermined time interval prior to the request by the user to change a password for an account as yet another form of safeguard.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Figure 3:
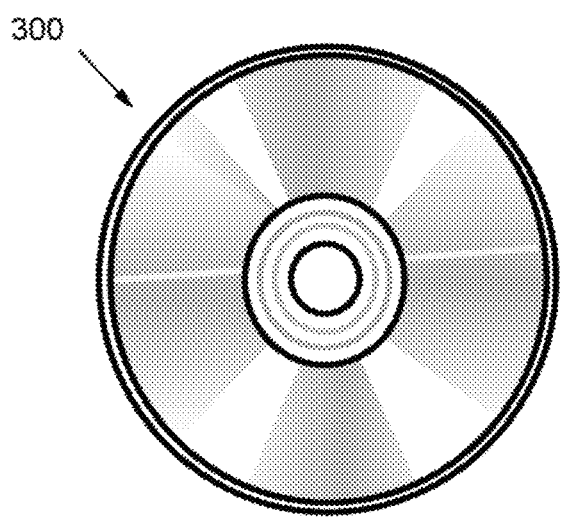
FIG. 3 is a representation of a tangible computer readable medium on which computer executable code or instruction are stored in a non-transistory form.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. As an example, an optical disc 300 is shown in FIG. 3. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described here with reference to flowchart illustrations (FIG. 2) and/or block diagrams of methods, apparatus (system 100, FIG. 1) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in FIGS. 1 and 2 illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the drawings and specifications there has been set forth a preferred embodiment of the invention and, although specific terms are used, the description thus given uses terminology in a generic and descriptive sense only and not for purposes of limitation.

What is claimed is:

1. A method for supervising modification of passwords controlling access to online accounts comprising:
    establishing for an online account user a universe of social contacts;
    inquiring of a portion of the social contacts in the universe upon a request by the user to change a password for an account; and
    enabling the user to change the password controlling access to the account upon confirmation of the users identity by a selected number of social contacts to whom inquiry is addressed;
    wherein the establishing of a universe of social contacts comprises selection by the account user of contacts to be included in the universe; the inquiring of a portion of the social contacts in the universe comprises selection by the account user of a percentage of the universe to be contacted; and the enabling of the user to change a password comprises selection by the account user of a number of contacted social contacts whose confirmation of identity is required for enablement.

2. A method according to claim 1 wherein the establishing of the universe of social contacts comprises delaying for an interval of time any change in the selection of contacts to be included in the universe.

3. A method according to claim 1 wherein the enabling of the user to change a password comprises disallowing enablement in the event that the universe of social contacts has been changed within a predetermined time interval prior to the request by the user to change a password for an account.

* * * * *